(12) United States Patent
Fontaine et al.

(10) Patent No.: US 10,097,270 B2
(45) Date of Patent: Oct. 9, 2018

(54) WAVELENGTH-SELECTIVE SWITCH FOR SPACE-DIVISION MULTIPLEXED SYSTEMS

(71) Applicant: Alcatel-Lucent USA, Inc., Murray Hill, NJ (US)

(72) Inventors: Nicolas K. Fontaine, Murray Hill, NJ (US); David Neilson, Murray Hill, NJ (US); Roland Ryf, Murray Hill, NJ (US)

(73) Assignee: WSOU Investments, LLC, Los Angeles, CA (US)

(*) Notice: Subject to any disclaimer, the term of this patent is extended or adjusted under 35 U.S.C. 154(b) by 0 days.

(21) Appl. No.: 15/674,393

(22) Filed: Aug. 10, 2017

(65) Prior Publication Data

US 2017/0359123 A1 Dec. 14, 2017

Related U.S. Application Data

(63) Continuation of application No. 14/491,670, filed on Sep. 19, 2014, now abandoned.

(60) Provisional application No. 61/880,603, filed on Sep. 20, 2013.

(51) Int. Cl.
*H04B 10/2581* (2013.01)
*H04Q 11/00* (2006.01)
*H04J 14/06* (2006.01)

(52) U.S. Cl.
CPC .......... *H04B 10/2581* (2013.01); *H04J 14/06* (2013.01); *H04Q 11/0005* (2013.01); *H04Q 2011/0088* (2013.01)

(58) Field of Classification Search
CPC ................. H04J 14/06; H04B 10/2581; H04Q 2011/0088; H04Q 11/0005
See application file for complete search history.

(56) References Cited

U.S. PATENT DOCUMENTS

| | | | |
|---|---|---|---|
| 7,400,793 B2 | 7/2008 | Tabuchl | |
| 7,471,696 B2 | 12/2008 | Hershey | |
| 8,761,217 B2 | 6/2014 | Tan | |
| 8,983,248 B2 | 3/2015 | Sorin | |
| 9,188,831 B2 | 11/2015 | Neilson | |
| 9,288,559 B2 | 3/2016 | Frisken | |
| 9,417,390 B2 | 8/2016 | Sorin | |
| 9,432,750 B1 * | 8/2016 | Li | H04Q 11/0005 |
| 2007/0237451 A1 | 10/2007 | Colbourne | |

(Continued)

OTHER PUBLICATIONS

Ryf, et al.; "Wavelength-Selective Switch for Few-Mode Fiber Transmission"; Sep. 22-26, 2013; Optical Communication (ECOC 2013); 3 pages.

(Continued)

*Primary Examiner* — Brian O'Connor
(74) *Attorney, Agent, or Firm* — Sean D. Burdick (57) ABSTRACT

An optical apparatus includes a front optics section and a spectrometer section. The front optics section includes a spot de-multiplexer configured to receive a plurality of multi-mode optical signals each having a plurality of modal components, and to output in a linear array of a corresponding plurality of optical beams for each multimode optical signal. The spectrometer section includes a wavelength steering element configured to separate each of the optical beams into a plurality of wavelength channels. A fiber steering element is configured to steer the wavelength channels between the optical beams.

20 Claims, 6 Drawing Sheets

(56) References Cited

U.S. PATENT DOCUMENTS

2009/0297097 A1   12/2009  Wagener
2012/0251105 A1   10/2012  Kwok
2014/0037244 A1    2/2014  Sorin
2014/0186038 A1    7/2014  Frisken
2015/0098697 A1    4/2015  Marom

OTHER PUBLICATIONS

Ryf, et al.; "Mode-Division Multiplexing Over 96 km of Few-Mode Fiber Using Coherent 6×6 MIMO Processing"; Feb. 15, 2012; Journal of Lightwave Technology; pp. 521-531.
Ryf, et al.; "Coherent 1200-km 6×6 MIMO Mode-Multiplexed Transmission over 3-core Microstructured Fiber"; Sep. 18-22, 2011; Optical Communication (ECOC); 3 pages.

\* cited by examiner

WAVELENGTH-SELECTIVE SWITCH FOR SPACE-DIVISION MULTIPLEXED SYSTEMS

CROSS-REFERENCE TO RELATED APPLICATION

This application is a continuation of U.S. patent application Ser. No. 14/491,670, entitled "WAVELENGTH-SELECTIVE SWITCH FOR SPACE-DIVISION MULTIPLEXED SYSTEMS", filed on Sep. 19, 2014, which claims the benefit of U.S. provisional application Ser. No. 61/880,603, filed on Sep. 20, 2013. The above-listed applications are commonly assigned with the present application are incorporated herein by reference as if reproduced herein in their entirety.

TECHNICAL FIELD

This application is directed, in general, to optical communications, and, more specifically, but not exclusively, to a wavelength-selective switch (WSS) applicable to space-division multiplexed (SDM) optical systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fiber optic communications commonly use single-mode fiber (SMF), which offered substantially greater bandwidth than traditional twisted-pair copper channels. SMF allows only one spatial mode, or "fiber-mode," of light to propagate through the channel, although multiple wavelengths (i.e., frequencies) may propagate within that mode. A mode defines how a wave is distributed in space and how it travels through space. Modes are described by the Helmholtz equations for waves; more specifically, each fiber-mode represents a particular solution to those equations. A SMF therefore exhibits little modal dispersion, making it suitable for long distance transmissions that require high fidelity and high bandwidth. Given their long distance and high bandwidth capabilities, SMFs are common among service providers, such as telephone companies and cable companies, and colleges and universities.

Alternate fibers which support more than one spatial mode have been developed including multi-core fiber (MCF) and multi-mode fiber (MMF). MCFs are fibers that have more than one core inside and allow multiple parallel spatial channels to provided additional capacity. Relative to SMF, MMF typically includes a single core that is larger than that of a SMF operating at the same wavelength, thereby allowing propagation of multiple modes through the core. Typically the larger core has been used to relax the accuracy of alignment between fibers and devices which may lend itself to lower-cost electronics and hardware for terminations and in-line equipment, making it suitable for applications nearer to the end users, MMF is limited by modal dispersion and chromatic dispersion. The impacts of distortions such as modal dispersion and chromatic dispersion are compounded over distance MMFs are commonly used as backbones for shorter distance local area networks (LANs) in buildings and on campuses.

To further improve the capacity of fiber systems, modulation techniques were developed to take advantage of the various dimensions of optical signals. One common technique is wavelength-division multiplexing (WDM), which utilizes two or more wavelengths to carry data. Another is polarization-division multiplexing (PDM), which utilizes differently, e.g. orthogonally, polarized signals to carry data. PDM is often combined with phase or quadrature modulation, which uses phase differences to distinguish signals. Yet another technique is space-division multiplexing (SDM) using MCF or MMF. SDM uses a spatial mode multiplexer (S-MUX) to launch multiple signals, into a MCF or MMF, and a spatial mode demultiplexer (S-DMUX) to demultiplex the multiple signals and coherently receive them.

SUMMARY

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. Its sole purpose is to present some concepts in a simplified form as a prelude to the more detailed description that is discussed later.

One embodiment provides an optical apparatus that includes a front optics section and a spectrometer section. The front optics section includes a spot de-multiplexer configured to receive a plurality of multi-mode optical signals each having a plurality of modal components, and to output in a linear array of M optical beams for each multimode optical signal. The spectrometer section includes a wavelength steering element configured to separate each of the optical beams into a plurality of wavelength channels. A fiber steering element is configured to steer the wavelength channels between the optical beams.

Some embodiments also include a polarization mode de-multiplexer configured to separate polarization modes of the optical beams. In some embodiments the wavelength steering element includes a diffraction grating configured to diffract the optical beams. In some embodiments the spot-demultiplexer includes a photonic lantern configured to separate the multi-mode optical signals into the optical beams. In some embodiments the linear array is arranged such that optical beams that correspond to modal components from same ones of the multi-mode optical signals are grouped together.

In some embodiments the spot demultiplexer includes a plurality of 3D waveguides, each waveguide of the plurality of waveguides corresponding to one of the modal components. In some such embodiments the front optics section further includes a plurality of collimators, each collimator being configured to collimate a corresponding one of the optical beams.

Another embodiment provides a method of forming an optical apparatus. The method includes configuring a spot de-multiplexer to receive a plurality of multi-mode optical signals each having M modal components, and to output in a linear array of M optical beams for each multimode optical signal. A wavelength steering element is located in a path of the optical beams and configured to separate each of the optical beams into a plurality of wavelength channels. A fiber steering element is configured to steer the wavelength channels between the optical beams.

Another embodiment provides a wavelength-selective switch (WSS) including a spot demultiplexer, a diffraction element and a steering element. The spot demultiplexer is configured to receive from a plurality of optical fibers M multi-mode optical signals and form therefrom M*N optical beams, where N>1. The diffraction element is configured to separate the optical beams into wavelength-resolved optical beams. The steering element is configured to direct a selected one of the wavelength-resolved optical beams from a first one of the optical fibers to a second one of the optical fibers.

In some embodiments the spot-demultiplexer includes a three-dimensional waveguide corresponding to each of the optical beams. In some embodiments the spot-demultiplexer is further operable to arrange the optical beams a linear array in which optical beams corresponding to each multimode optical signal are grouped together. In some embodiments the steering element includes a liquid-crystal on silicon (LCoS) device. In some embodiments the steering element is operable to receive a Fourier transform of the wavelength-resolved optical beams. Some embodiments also include a polarization diversity element configured to separate polarization modes of the optical signals.

BRIEF DESCRIPTION

Reference is now made to the following descriptions taken in conjunction with the accompanying drawings, in which.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

High-bandwidth WDM optical systems typically include a WSS. The WSS may route optical signals from a common port to N multi-wavelength ports. The wavelengths may each represent a wavelength channel. Typically, each wavelength channel of an incoming signal can be passed or dropped through each of the N multi-wavelength ports. An optical signal may enter the WSS through an input fiber connected to a port, pass through one or more lenses in a "front optics" section, and is further propagate to a dispersive element in a "steering" section. The dispersive element may operate as a wavelength de-multiplexer, separating the optical signal into its wavelength components. The separated components may further propagate through a "back optics" section to be attenuated or directed by steering elements, typically reflective elements. The reflected light may then pass back through the back optics, via the dispersive element which may then operate as a wavelength multiplexer, through the front optics, and be coupled back into an output fiber. The components are optically couplable to each other, meaning they are assembled such that beams of light pass from one to the other. For example, fiber cables may optically couple to ports by inserting one connector into another, using the fiber as the transmission medium. One lens may optically couple via a free-space propagation path to another lens by mounting the lenses in series.

The ports of a WSS may be arranged as a one-dimensional array of input/output fibers having linear separation. The dimension of the array, sometimes referred to as the "steering dimension," may be parallel or perpendicular to the wavelength spreading produced by the dispersive element, sometimes referred to as the "wavelength dimension." The steering dimension grows with each additional input/output fiber. Furthermore, the steering dimension typically grows proportionally with the number of spatial and polarization modes introduced by SDM and PDM schemes. An SDM optical signal contains multiple spatially diverse modes, or "patterns." A PDM optical signal contains multiple polarization-diverse patterns. Each of the ports is mapped to an angular deflection of the steering elements. For a given wavelength, beams from all ports converge on a steering element that is deflected according to a routing computed by a switching engine, thereby routing one beam of the given wavelength from an input fiber to an output fiber, and blocking or attenuating all other beams of that wavelength.

The port count of a WSS is practically limited by its cost and size, particularly the optics size. Increasing the port count generally requires larger optics to process the signals. Additionally, the port count is limited by the maximum steering angle for the steering element. Most WSS employ a micro-electromechanical systems (MEMS) micro-mirror steering element or a liquid crystal cell having a physical maximum steering angle. Increasing the port count increases the steering dimension of the WSS and therefore the necessary steering angle.

It is realized herein that high port counts can be achieved in a SDM WSS by, e.g., interleaving fibers such that spatially diverse patterns, generated by an S-DMUX, are spatially grouped into switching groups. In some embodiments a maximum steering angle of such an ADM WSS can be comparable to that of a SMF WSS. In various embodiments the S-DMUX receives inbound SDM optical signals, having multiple modes, and generates diverse linear combinations of those modes. The diverse linear combinations of those modes are themselves diverse spatial patterns. It is also realized herein that diverse spatial patterns may alternatively be arranged in a two-dimensional array having a wavelength dimension and a steering dimension.

It is further realized herein the remapping of the diverse spatial patterns may preferably be done at the input to the steering section of the WSS, or in the front optics. Front optics of a WSS may include a fiber array through which multi-mode signals pass into the system and a micro-lens array for collimating the inbound beams. Some WSSs use anamorphic optics to further condition the beams before they reach the steering section. Additionally, if the system uses polarization-division multiplexing, the WSS may include a polarization-division de-multiplexer. It is realized herein that the remapping may be preferably performed among these components. For example, in some embodiments a remapper is optically coupled between the fiber array and the micro-lens array. In some embodiments remappers, such as some three-dimensional waveguides, include an S-DMUX component, making it unnecessary to include another within the WSS. In other embodiments, such as those including a photonic lantern, may be implemented without an S-DMUX.

Figure 1:
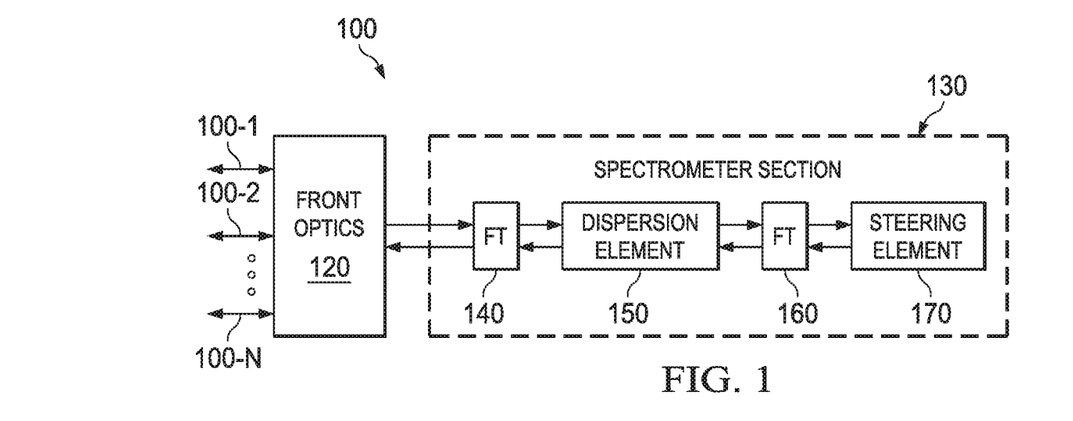
FIG. 1 is a block diagram of an optical apparatus, e.g. a WSS, according to one example embodiment.

Turning to FIG. 1, a block diagram of one embodiment of a WSS 100 is illustrated. The WSS 100 includes ports 110-1 through 110-N, front optics 120, and a spectrometer section 130. The ports 110-1 through 110-N are optically coupled to the front optics 120. The front optics 120 are optically coupled to the spectrometer section 130. The WSS 100 is operable to dynamically route, block, and attenuate WDM optical signals in a network. A wavelength channel injected into one of the ports 110-1 through 110-N is may be routed independent of all other wavelength channels.

Optical signals, conveyed via beams, arrive at the WSS 100 over fibers, e.g. SMF, MMF, or MCF. The fibers are optically coupled to the ports 110-1 through 110-N. The ports 110-1 through 110-N are preferably arranged linearly, with a consistent spacing, or pitch. The front optics 120 conditions beams received through the ports 110-1 through 110-N. The front optics 120 can include lenses, mirrors, de-multiplexers, and a variety of other optics. These components may shape the individual beams as well as all beams as a whole in an effort to optimize the spectrometer section 130. The front optics 120 are addressed in greater detail in FIG. 2 and related description below.

The spectrometer section 130 includes a Fourier transform element 140, a dispersion element 150, a Fourier transform element 160, and a steering element 170. The Fourier transform element 140, which for example may be implemented by a lens, operates to perform an optical Fourier transform on the beams received from the front optics 120. The dispersion element 150 operates as a wavelength de-multiplexer (DMUX), e.g. operates to separate the beams into their respective wavelength components, e.g. channels. One example of a dispersion element that may be used is a diffraction grating, e.g. a 1200 line/mm reflective grating. The efficiency of the dispersion element 150 may depend on the beam shape as it exits the front optics 120 and enters the spectrometer section 130. For example, beams having a larger cross-sectional area, which form larger spots at the dispersion element 150 may be more effectively dispersed than beams having a smaller cross-sectional area.

The Fourier transform element 160 performs another optical Fourier transform on the light beams, and may include one or more lenses. Various beam parameters, e.g. beam isolation, loss, and precision, may depend on the properties of the steering element 170. The steering element 170 is responsible for routing the respective wavelength components received from the dispersion element 150 and routed through the Fourier transform element 160. In some embodiments the steering element 170 uses a single reflective element, while in other embodiments an array of elements may be used, such as MEMS micro-mirrors or a liquid crystal array, e.g. liquid-crystal on silicon (LCoS). The steering element 170 may route each wavelength channel independent of other wavelength channels by deflecting a reflective element in a steering dimension. In some embodiments the steering element 170 may route the wavelengths by multi-level holograms. The deflection of the wavelength channels by the steering element 170 is referred to as the steering angle, and is directly related to the available port count for the WSS 100. The steering angle for the steering element 170 may be dynamically controlled by a switching engine that supplies a calibrated voltage or current to the steering element 170 to achieve a desired deflection. The switching engine maintains a mapping of deflection values to a given port on the WSS 100.

Once the beams are routed by the steering element 170, the routed beams pass back through the spectrometer section 130 and the front optics 120, and are coupled back into the fibers via the ports 110-1 through 110-N. The Fourier transform elements 140/160 are preferably bidirectional, as is the dispersion element 150. The dispersion element 150 combines the respective wavelength components back into a multi-wavelength beam that is passed on to the front optics 120. The front optics 120 reshapes the routed beams so they can be coupled back into the appropriate port and fiber.

Figure 2:
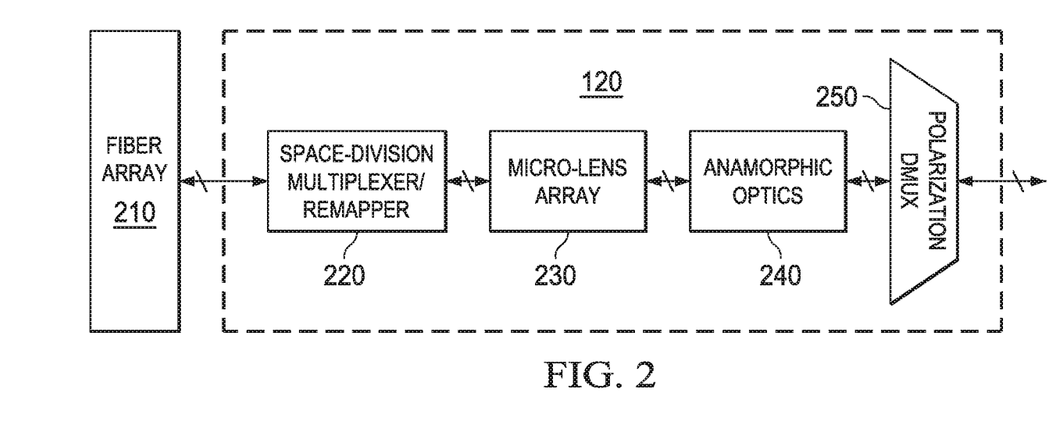
FIG. 2 is a block diagram of an optical apparatus, e.g. a remapping optical module, that may be used in some embodiments of the apparatus of FIG. 1, e.g. to remap received SDM signals to a linear array of beams corresponding to the SDM signals.

FIG. 2 is a block diagram of one embodiment of the front optics 120 in one embodiment. The front optics 120 provide mode multiplexing/demultiplexing and remapping of SDM optical signals received via the ports 100-1 . . . 100-N. In the illustrated embodiment the multimode optical signals are received via a fiber array 210. The signals propagate to a space-division MUX/remapper 220, a micro-lens array 230, anamorphic optics 240, and a polarization DMUX 250.

Figure 4A:
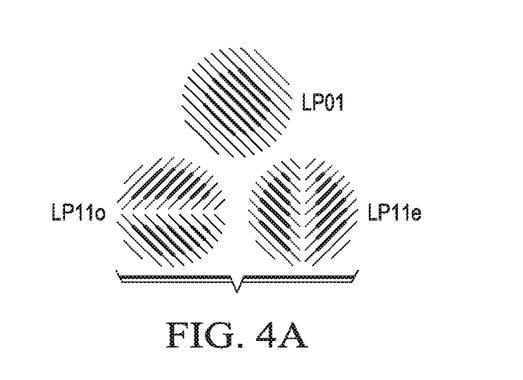
FIG. 4A illustrates three propagation modes of a multi-mode optical signal.

In some embodiments, the fiber array 210 is a one-dimensional array having a consistent pitch. The fiber array 210 is optically coupled to the MUX/remapper 220, sometimes referred to as a spatial mode MUX. The MUX/remapper 220 may be implemented by, e.g. a 3D waveguide or photonic lantern. The SDM beams are separated into orthogonal spatial patterns by the space-division MUX/remapper 220. In this context "orthogonal" refers to the mathematical orthogonality of the spatial patterns. The orthogonal spatial patterns are linear combinations of the received modes. The spatial patterns are output as a number of beams, or spots, corresponding to the number of modes of the received SDM signals. For example, if a single received SDM signal includes three modes, e.g. $LP_{01}$, $LP_{11o}$ and $LP_{11e}$ then the MUX/remapper 220 may produce three beams (spots) that are linear combinations of the $LP_{01}$, $LP_{11o}$ and $LP_{11e}$ modes. For reference, these modes are illustrated without limitation by FIG. 4A.

Figure 4B:
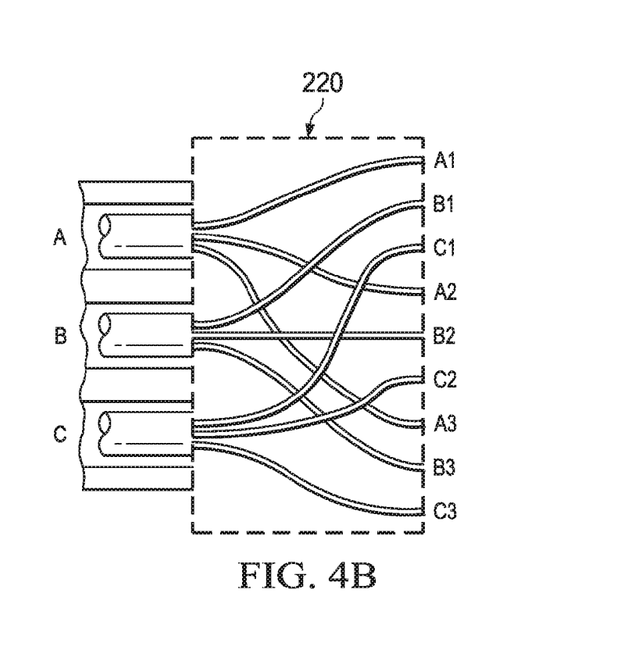
FIG. 4B illustrates aspects of an example 3D waveguide that may be used as a MUX/remapper in various embodiments.

The MUX/remapper 220 preferably outputs the optical beams in a linear array. Some embodiments group corresponding linear combinations from each of the input ports together. Referring to FIG. 4B, a 3D waveguide is shown in which each of three input fibers A, B, and C provide $LP_{01}$, $LP_{11o}$ and $LP_{11e}$ propagation modes. The MUX/remapper 220 arranges the output beams such that such that optical beams that correspond to modal components from same ones of the received optical signals are grouped together. Thus, respective orthogonal linear combinations such that the fibers of the fiber array 210 are interleaved and the orthogonal spatial patterns are spatially grouped into switching groups. The MUX/remapper 220, in certain embodiments, remaps the orthogonal spatial patterns into a one-dimensional array having a steering dimension. In other embodiments, the MUX/remapper 220 remaps the orthogonal spatial patterns into a two-dimensional array having a steering dimension and a wavelength dimension. Again, orthogonal spatial patterns are spatially grouped. In alternate embodiments, the MUX/remapper 220 and the MUX/remapper 220 are packaged together as a remapper, making a separate space-division MUX unnecessary. This is the case in certain embodiments where the MUX/remapper 220 is a three-dimensional waveguide. The MUX/remapper 220, in other embodiments, can be a fiber bundle configured for the remapping. In yet other embodiments, the MUX/remapper 220 includes a photonic lantern.

The micro-lens array 230, optionally but preferably present, is optically coupled to the MUX/remapper 220. The lens elements of the micro-lens array 230 include collimating lenses for conditioning the respective modal components, e.g. producing Gaussian beams. The micro-lens array 230 may also increase the fill-factor, e.g. spot size, to reduce the necessary optics size and steering angle of the steering element 170. The micro-lens array 230 preferably is configured to maintain the pitch of the fiber array 210.

The orthogonal spatial patterns are further conditioned by the anamorphic optics 240, which may be implemented by one or lenses. The anamorphic optics 240 are typically designed and tuned to complement down-stream optics components in the spectrometer section 130.

The polarization DMUX 250 may optionally be used when the SDM optical signals employ polarization diversity, or polarization-division multiplexing (PDM), in addition to spatial diversity, or SDM. The polarization DMUX 250 separates the beams from the MUX/remapper 220 (or the micro-lens array 230 if present) into polarization components, e.g. H and V components. In alternate embodiments, the polarization DMUX 250 is optically coupled between the micro-lens array 230 and the anamorphic optics 240. In yet other embodiments, the polarization DMUX 250 is integrated with the MUX/remapper 220.

Figure 3A:
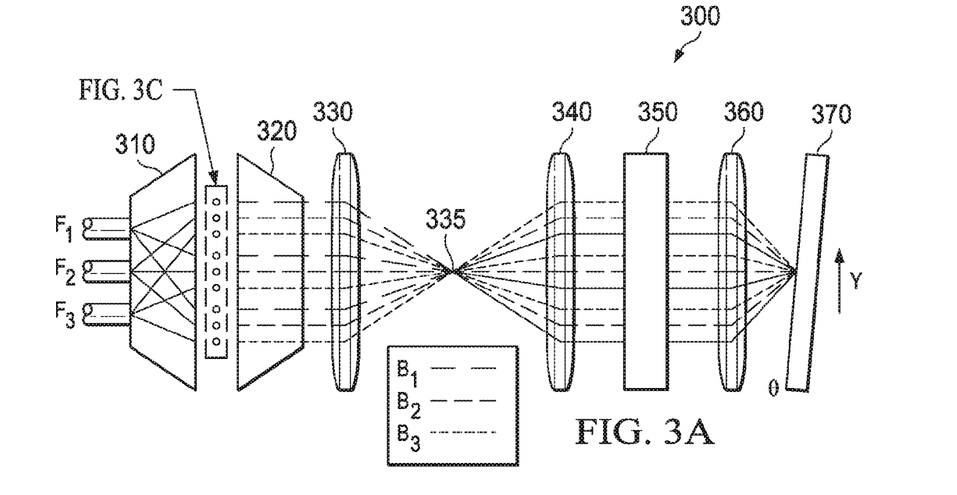
FIGS. 3A and 3B illustrate two views of a WSS consistent with the block diagrams of FIGS. 1 and 2 and showing additional detail.
Figure 3B:
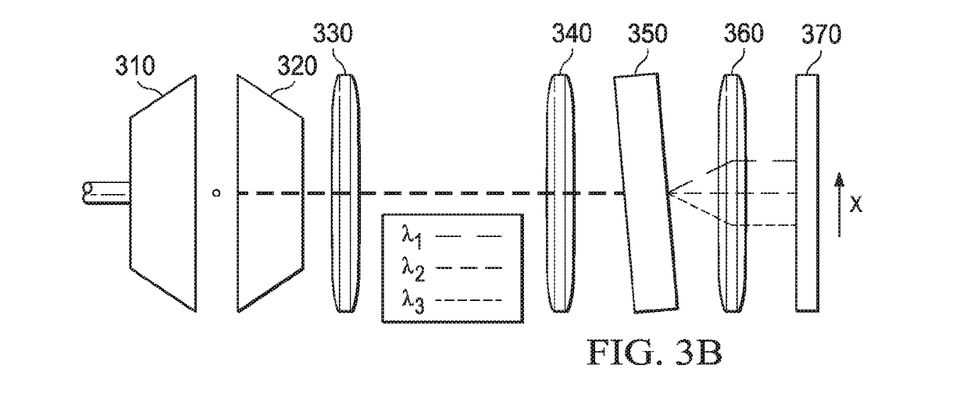
Figure 3C:
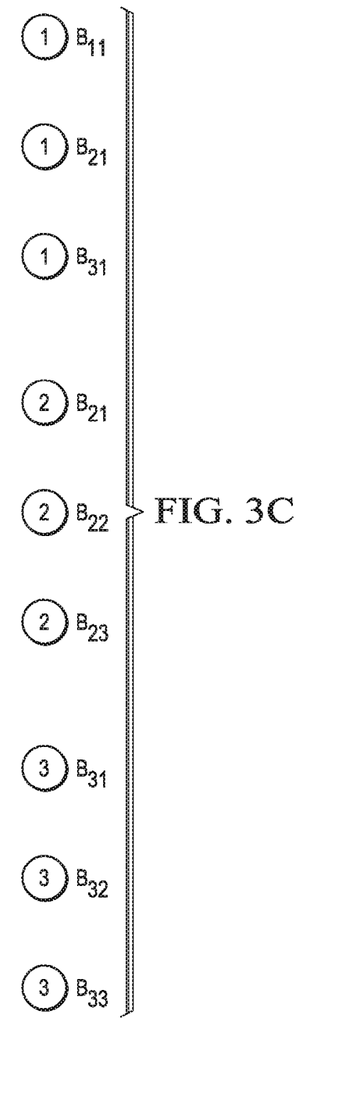
FIG. 3C illustrates a mode-grouped array of spots produced during operation of one of the previous figures.

Further understanding of aspects of the invention is provided by reference to FIGS. 3A-3C, which show an embodiment in greater detail. FIG. 3A illustrates an apparatus, e.g. a WSS 300, from a viewpoint orthogonal to a fiber switching dimension y. FIG. 3B illustrates the same apparatus from a viewpoint orthogonal to a wavelength dispersion direction x. A MUX/remapper 310, polarization MUX/DMUX 320 and a lens 330 provide functionality of the previously described front optics 120. Lenses 340/360, a diffraction grating 350 and a mirror 370 provide functionality of the previously described spectrometer 130. The MUX/remapper 310 receives signals having M modes, or modal components, from each of three MMFs, $F_1$-$F_3$. The MUX/remapper 310 forms from each of the received multi-mode signals three beams, $B_1$-$B_3$. Each beam is a linear combination of the received modes of the multi-mode signal of a particular fiber. In this example, each beam has three modal components, $LP_{01}$, $LP_{01o}$, and $LP_{01e}$. The beams may be referred to as $Bx_1$, $Bx_2$ and $Bx_3$, where X refers to the fiber number over which the beam is received, and the designator 1, 2, or 3 refers to the particular linear combination of the received $LP_{01}$, $LP_{01o}$ and $LP_{01e}$ modes.

In the illustrated embodiment, the beams are arranged at the output of the MUX/remapper 310 such that such that optical beams that correspond to modal components from same ones of said multi-mode optical signals are grouped together. For example, with reference to FIG. 3C, the nine beams output by the MUX/remapper 310 are grouped by linear combination, to the top three beams (spots) are the $Bx_1$ combinations, the middle three beams are the $Bx_2$ combinations, and the bottom three beams are the Bx3 combinations. The beams are preferably arranged in a linear array as shown. Moreover, while the groupings are shown spaced apart slightly for the purpose of illustration, it may be preferable that all the spots are spaced equidistantly from neighboring spots.

Returning to FIGS. 3A/3B, the polarization MUX/DMUX 320 is shown as an optional configuration, but for simplicity the different polarization modes that would be produced for received PDM signals are omitted from the figure. The lens 330 converges the beams at a point 335, which are collimated by the lens 340. The beams pass though the grating 350, and, referring to FIG. 3B, are diffracted into $\lambda_1$, $\lambda_2$, and $\lambda_3$ components. These components may correspond to channels of a wavelength-division multiplexed (WDM) optical communication system. The mirror 370 operates to steer wavelength components between the fibers $F_1$-$F_3$ by, e.g. using mirror pixel elements or generating a multi-level hologram to redirect a received wavelength channel to a different fiber than that from which it was received. A wavelength channel not being switch may be directed to the same fiber from which it was received. The reflected beams pass through the lens 360, are spectrally recombined at the grating 350, pass through the lenses 340/330 and couple back to the propagation modes of the fibers $F_1$-$F_3$ via the MUX/remapper 310.

Additional details regarding some embodiments are described in N. Fontaine, R. Ryf, C. Liu, B. Ercan and D. Neilson, "Few-Mode Fiber Wavelength Selective Switch with Spatial-Diversity and Reduced-Steering Angle", Optical Fiber Communication Conference, Optical Society of America, 2014, incorporated herein by reference in its entirety.

Figure 5A:
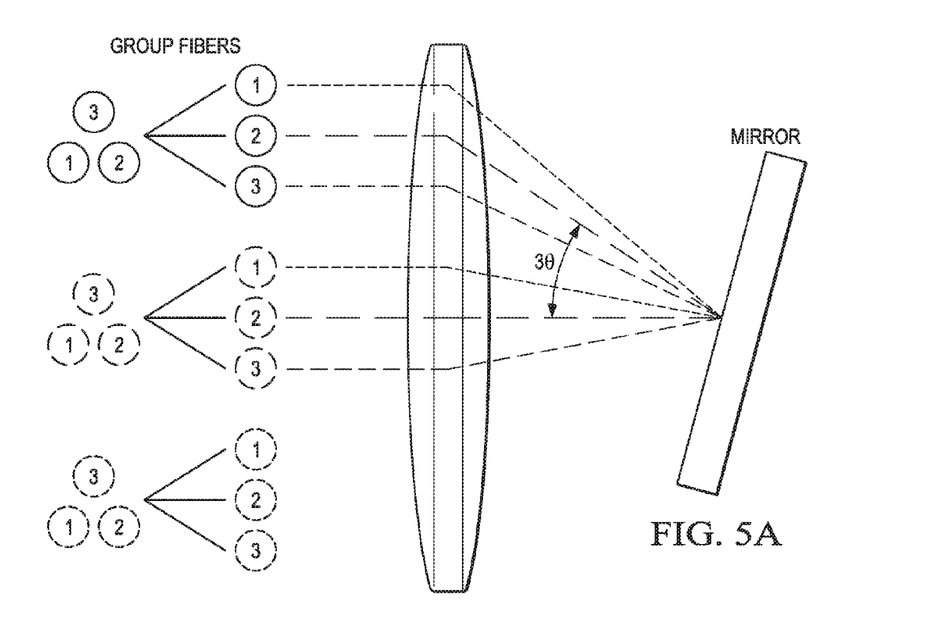
FIGS. 5A/5B illustrate aspects of steering angle for cases of fiber grouping (FIG. 5A) and mode grouping (FIG. 5B)
Figure 5B:
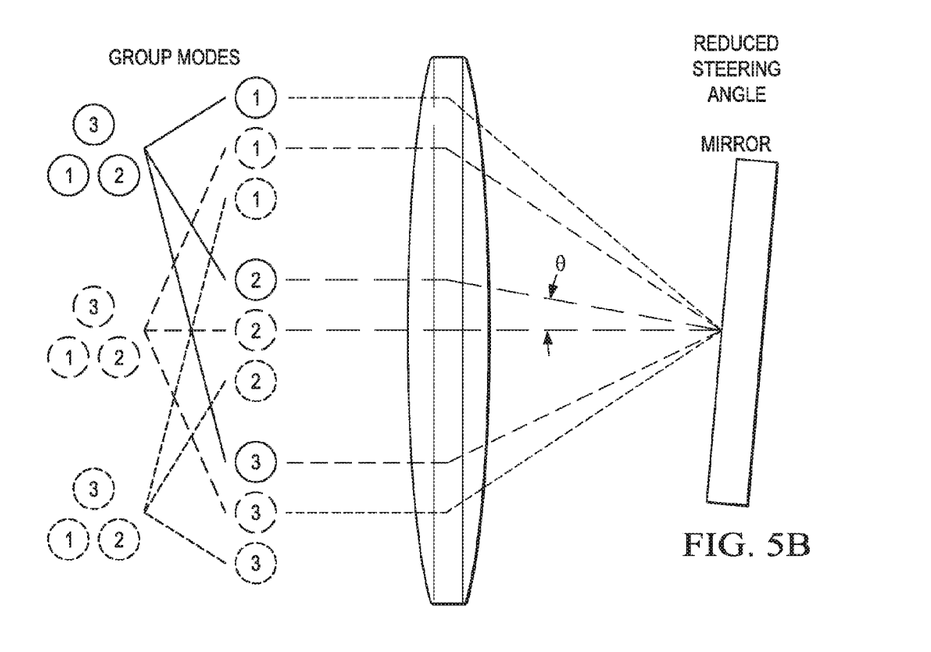

Referring to FIGS. 5A/5B, aspects of the channel steering are now described. In some embodiments not illustrated the MUX/remapper 310 may be configured to group the beams derived from the received multi-mode signals fibers into groups such that the beams from the same fiber are grouped together. This configuration may be referred to herein as "fiber grouped" or "fiber interleaved". FIG. 5A illustrates such an embodiment. Alternatively, and as described with respect to FIGS. 3A/3B, the MUX/remapper 310 may be configured to group the beams derived from the received multi-mode signals fibers into groups such that the beams formed from the same linear combination of modes are grouped together. This configuration may be referred to herein as "mode grouped" or "fiber interleaved". In the mode-grouped case, a wavelength channel being directed from one fiber to another fiber may require a deflection angle of θ, as needed to deflect the channel from its original spot at the MUX/remapper 310 to another spot in the same mode group. In contrast, in the fiber-grouped case, a wavelength channel may require a deflection angle of 3θ to deflect the channel from its original spot to spot in a different fiber group. Thus, the mode-grouped configuration may reduce demands on the mirror 370.

Figure 6:
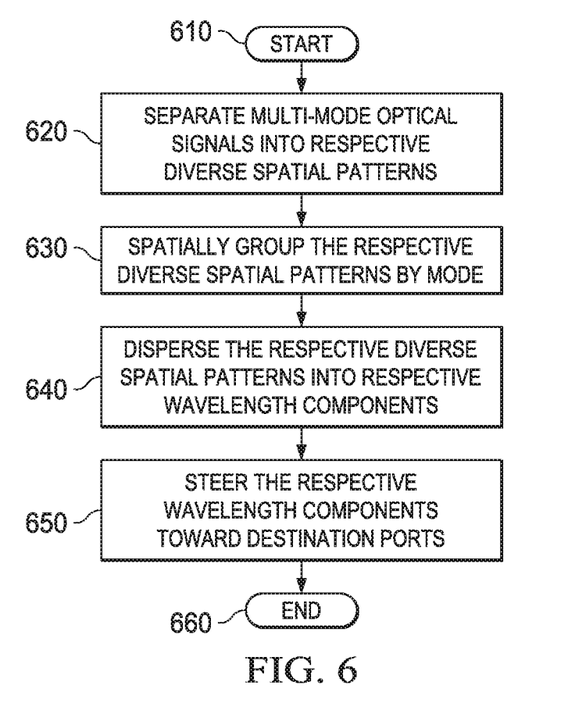
FIG. 6 is a flow diagram of one embodiment of a method of wavelength-selective switching.

Turning to FIG. 6, a flow diagram is shown of one embodiment of a method of wavelength-selective switching. The method begins at a start step 610. At a DMUX step 620, multi-mode optical signals are separated into respective diverse spatial patterns that are linear combinations of the multi-mode optical signals' respective modal components. The multi-mode optical signals have at least spatial diversity. In certain embodiments, the multi-mode optical signals also have polarization diversity and require a second DMUX step for separating out the polarization components.

At a remapping step 630, the respective diverse spatial patterns are fiber-interleaved. In certain embodiments the remapping arranges the respective modal components in a one-dimensional array. This dimension may be referred to as the "steering dimension". In alternate embodiments, the remapping arranges the respective diverse spatial patterns in a two-dimensional array having a steering dimension and a wavelength dimension.

The DMUX step 620 and the remapping step 630 are typically carried out in a front optics portion of a WSS. The resulting remapped respective diverse spatial patterns then enter a spectrometer section.

At a dispersion step 640, the respective diverse spatial patterns are separated into respective wavelength components. Dispersion is carried out by a dispersion element, such as a refraction grating. The respective wavelength components are then routed at a steering step 650. The steering step 650 includes computing a deflection of a steering element such that a particular wavelength component is routed from a source fiber to a destination fiber. The computed deflection is achieved by generating a signal to control the deflection, or steering angle, of the steering element. The wavelength components reflect off respective steering elements and return back through the spectrometer section, front optics, and on toward destination fibers.

Figure 7:
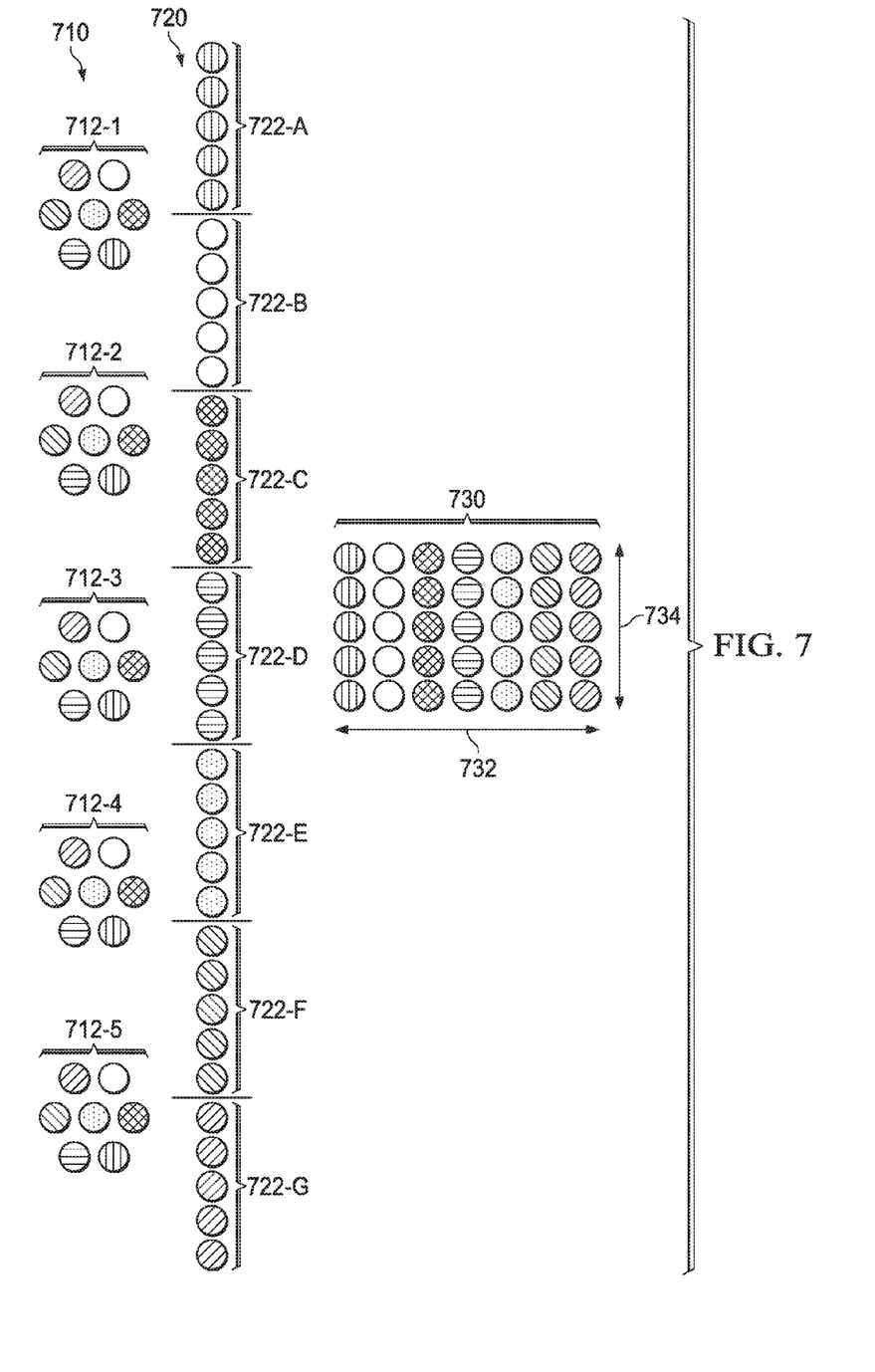
FIG. 7 is a diagram illustrating one embodiment of remapping of multi-mode optical signals.

FIG. 7 is a diagram illustrating one embodiment of a remapping of multi-mode optical signals. The multi-mode optical signals are received via a fiber array 710. The fiber array 710 includes MCFs 712-1 through 712-5. Each of the MCFs 712-1 through 712-5 has seven cores arranged in a hexagonal format plus a center core. Each core is configured to carry a single mode, and each single mode is a respective modal component of the multi-mode optical signal carried by that fiber.

The multi-mode optical signals of the MCFs 712-1 through 712-5 are demultiplexed into linear combinations of the respective single mode components. The linear combinations, or diverse spatial patterns, are remapped to an interleaved fiber array 720. The interleaved fiber array 720 is organized in a one-dimensional array, that dimension being the steering dimension. The interleaved fiber array 720 is also spatially grouped into switching groups, including: switching group 722-A, 722-B, 722-C, 722-D, 722-E, 722-F, and 722-G. Such an arrangement can operate effectively with a reduced maximum steering angle relative to a linear array grouped by fiber and mode-interleaved.

Alternatively, the linear combinations of the respective single mode components of the MCFs 712-1 through 712-5 are remapped to a two-dimensional array 730. The two-dimensional array 730 has a steering dimension 732 and a wavelength dimension 734. Similar to the interleaved fiber array 720, the two-dimensional array 730 can operate effectively using a reduced maximum steering angle relative to a linear array grouped by fiber and mode-interleaved.

While this invention has been described with reference to illustrative embodiments, this description is not intended to be construed in a limiting sense to only the illustrated embodiments.

Unless explicitly stated otherwise, each numerical value and range should be interpreted as being approximate as if the word "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the following method claims, if any, recite steps in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An optical apparatus, comprising:
   a mode remapper configured to receive a plurality N of multi-mode optical signals each having M modal components, and to output M linear arrays of N optical beams, each array including a same modal component from each multi-mode optical signal;
   a spectrometer
   configured to separate each of said optical beams into a plurality of wavelength channels; and
   an optical steering element configured to steer a selected one of said wavelength channels between said optical beams.

2. The optical apparatus recited in claim 1 wherein said mode remapper includes a plurality of 3D waveguides, each waveguide of said plurality of waveguides corresponding to one of said modal components.

3. The optical apparatus recited in claim 2 wherein said mode remapper further includes a plurality of collimators, each collimator being configured to collimate a corresponding one of the optical beams.

4. The optical apparatus recited in claim 1 further comprising a polarization mode demultiplexer configured to separate polarization modes of said optical beams.

5. The optical apparatus recited in claim 1 wherein said spectrometer includes a diffraction grating configured to separate said wavelength channels.

6. The optical apparatus recited in claim 1 wherein said mode remapper includes a photonic lantern configured to separate said multi-mode optical signals into said optical beams.

7. The optical apparatus recited in claim 1, wherein said optical steering element includes a MEMS micro-mirror configured to steer said selected one between optical beams within a single linear array.

8. A method of forming an optical apparatus, comprising:
   configuring a mode remapper to receive a plurality N of multi-mode optical signals each having M modal components, and to output M linear arrays of N optical beams, each array including a same model component from each of said multi-mode optical signals;
   locating in a path of said optical beams a spectrometer configured to separate each of said optical beams into a plurality of wavelength channels; and
   configuring an optical steering element to steer a selected one of said wavelength channels between said optical beams.

9. The method recited in claim 8 wherein said mode remapper includes a plurality of 3D waveguides, each waveguide of said plurality of waveguides corresponding to one of said modal components.

10. The method recited in claim 9 further comprising configuring a plurality of collimators such that each collimator is located to collimate a corresponding one of the optical beams.

11. The method recited in claim 8 further comprising configuring a polarization mode demultiplexer to separate polarization modes of said optical beams.

12. The method recited in claim 8 wherein said spectrometer includes a diffraction grating configured to separate said wavelength channels.

13. The method recited in claim 8 wherein said mode remapper includes a photonic lantern configured to separate said multi-mode optical signals into said optical beams.

14. The method recited in claim 8, wherein said optical steering element includes a MEMS micro-mirror configured to steer said selected one only between optical beams within a single linear array.

15. A wavelength-selective switch (WSS), comprising:
   a mode remapper configured to receive, from a plurality N of optical fibers, M multi-mode optical signals and form therefrom M*N optical beams, where N>1;
   a diffraction element configured to separate said optical beams into wavelength-resolved optical beams; and
   an optical steering element configured to direct a selected one of said wavelength-resolved optical beams from a first one of said optical fibers to a second one of said optical fibers.

16. The WSS recited in claim 15 wherein said mode remapper includes a three-dimensional waveguide corresponding to each of said optical beams.

17. The WSS recited in claim 15 wherein said steering element comprises a liquid-crystal on silicon (LCoS) device.

18. The WSS recited in claim 15 further comprising a polarization diversity element configured to separate polarization modes of said optical signals.

19. The WSS recited in claim 15 wherein said steering element is operable to receive a Fourier transform of said wavelength-resolved optical beams.

20. The WSS recited in claim 15, wherein said optical steering element includes a MEMS micro-mirror and is operable to steer said selected one only between optical beams within a single linear array.

* * * * *